R. GRANT.
TRANSMISSION MECHANISM.
APPLICATION FILED MAR. 30, 1917.
1,257,479.
Patented Feb. 26, 1918.
6 SHEETS—SHEET 5.
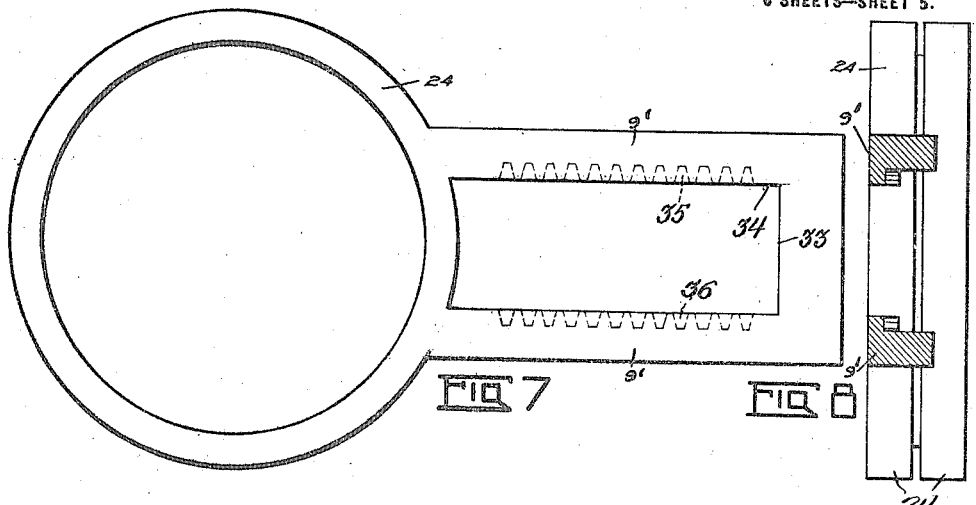
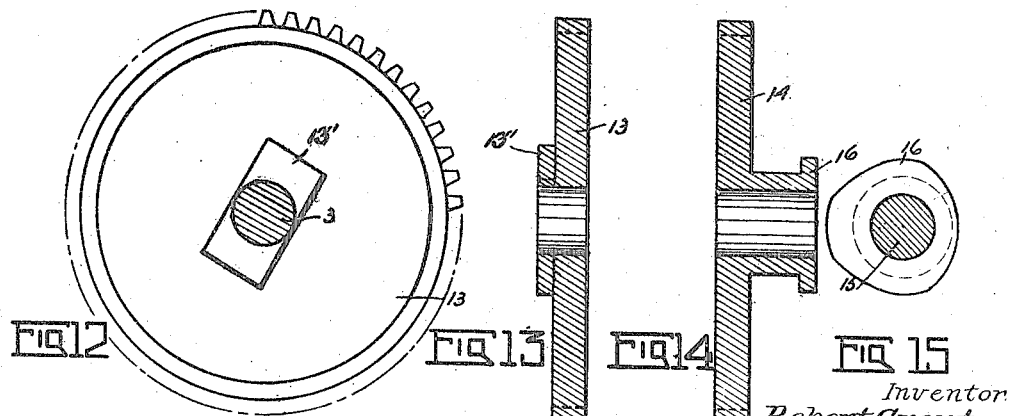
Witnesses:
J. H. Crawford.
Eva W. Springer.
Inventor
Robert Grant,
Victor J. Evans

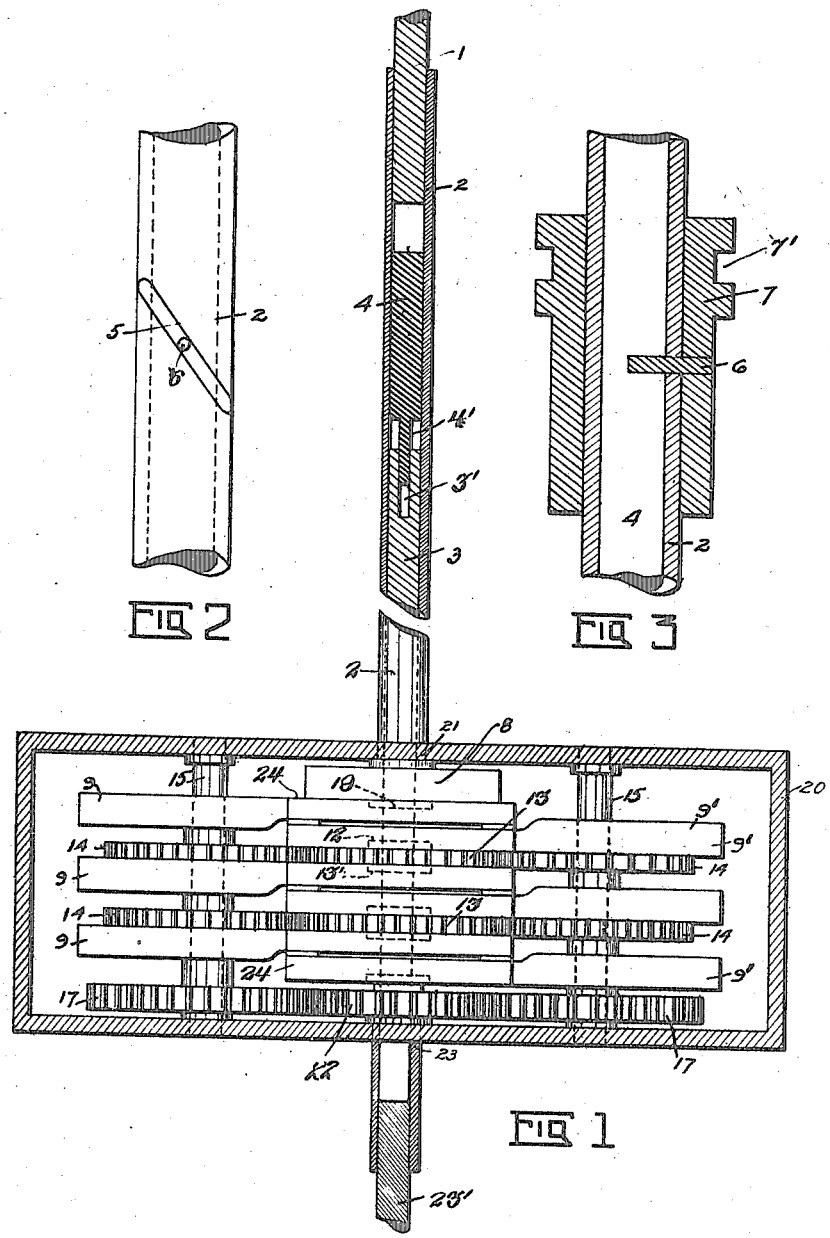

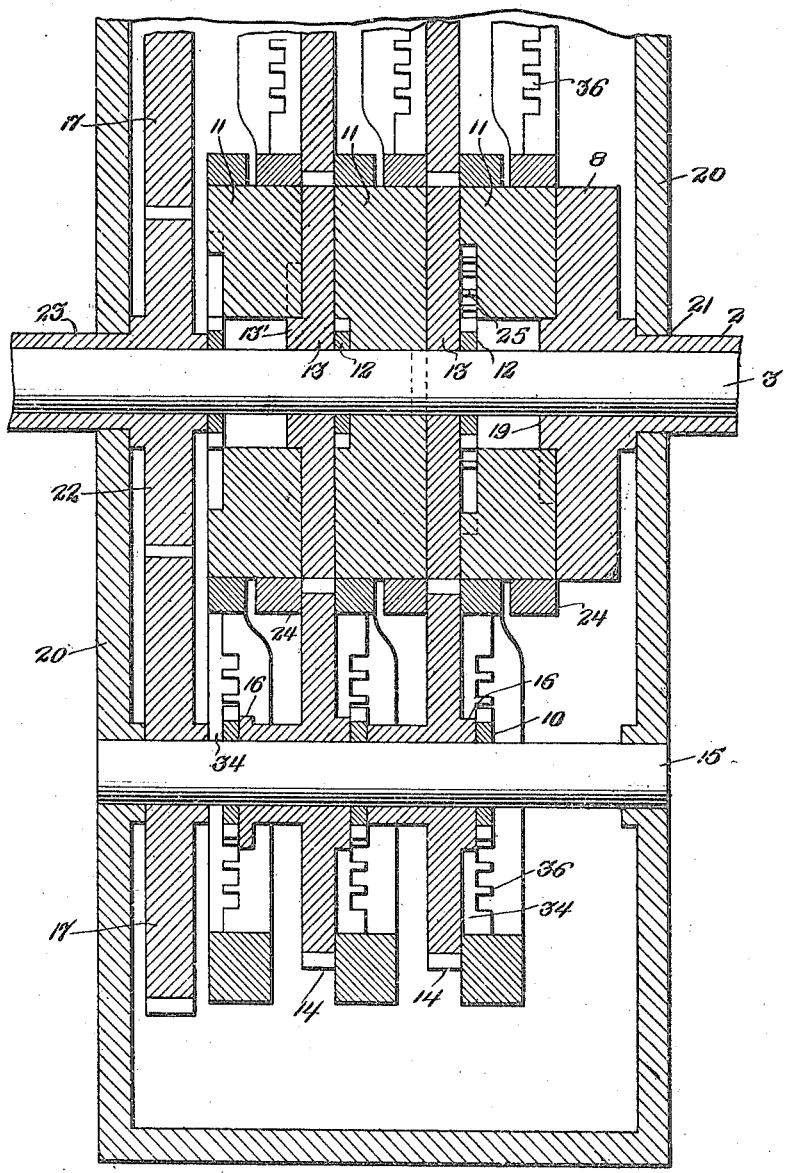

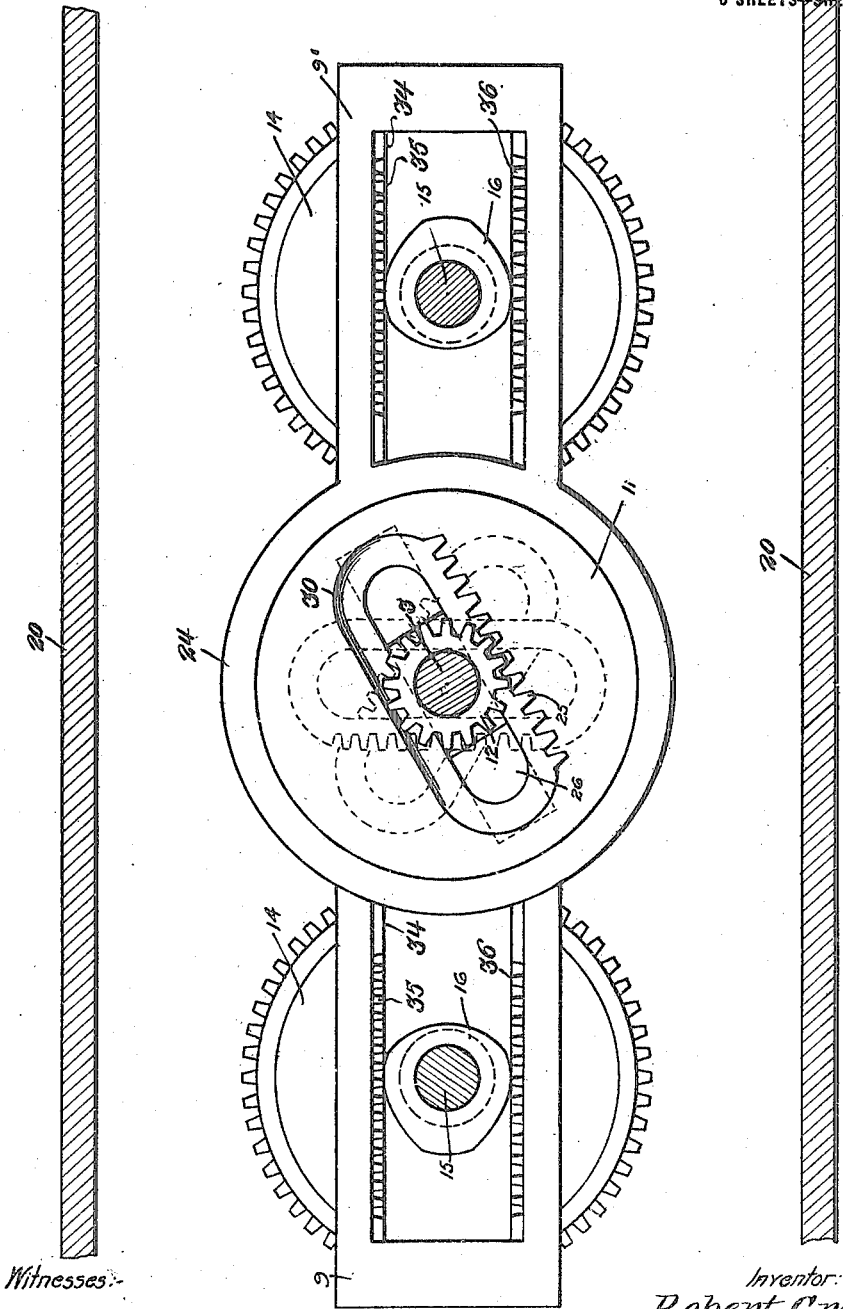

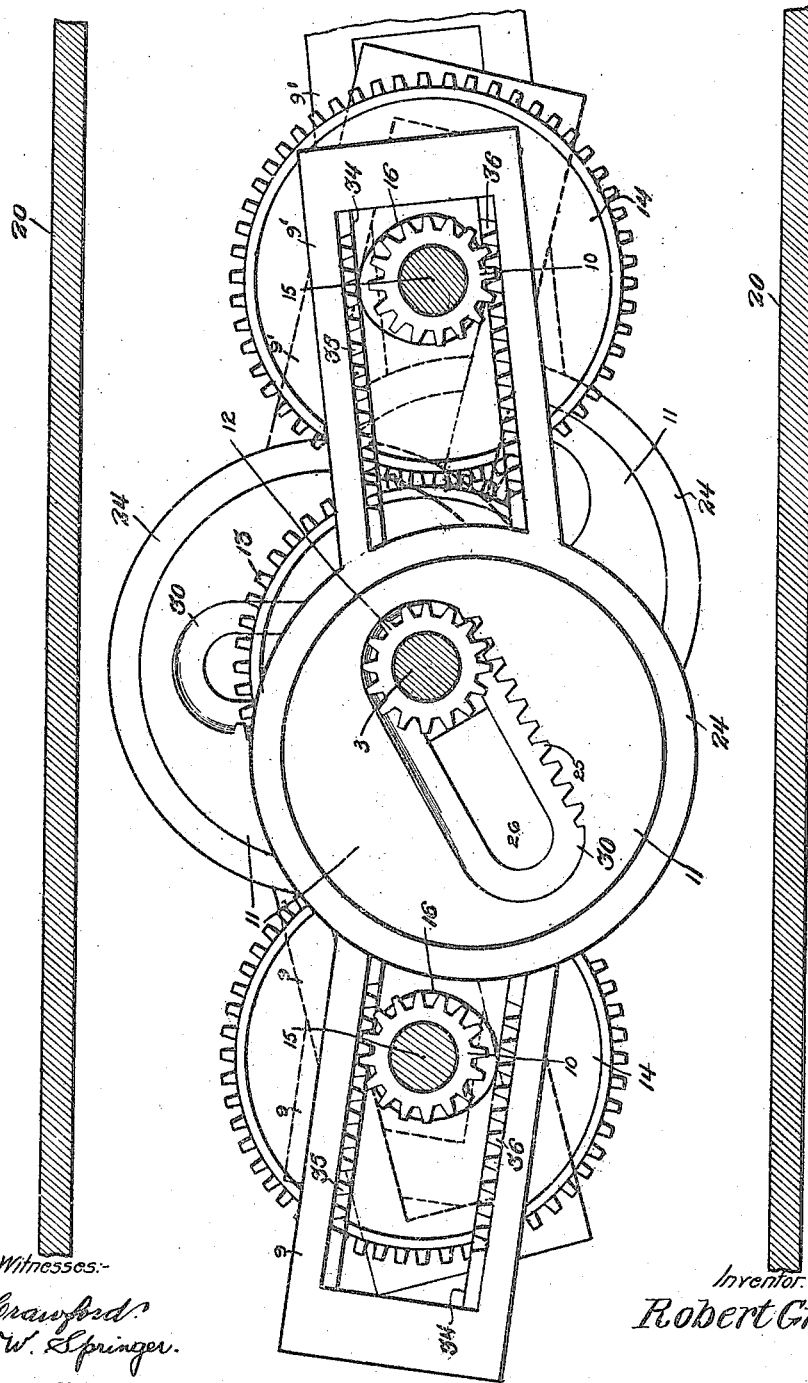

UNITED STATES PATENT OFFICE.

ROBERT GRANT, OF EDMONTON, ALBERTA, CANADA.

TRANSMISSION MECHANISM.

1,257,479.  Specification of Letters Patent.  Patented Feb. 26, 1918.

Application filed March 30, 1917.  Serial No. 158,671.

*To all whom it may concern:*

Be it known that I, ROBERT GRANT, a citizen of the Dominion of Canada, residing at Edmonton, in the Province of Alberta and Dominion of Canada, have invented new and useful Improvements in Transmission Mechanism, of which the following is a specification.

This invention relates to improvements in transmission mechanism and more especially to mechanism of the character indicated designed for use in connection with internal combustion engines. It has been customary in applying the power from such an engine for driving an automobile or the like to employ a clutch and a series of gears in order to provide for high speed, low speed, and for the reverse, and it is of course necessary to throw out the clutch when effecting a change of speed. This results in lost time and there is no provision in the transmission mechanism proper for securing a speed other than that made possible by the gearing.

The primary object of this invention is to provide mechanism which will overcome this objection and which will afford all of the advantages incident to the use of the transmission usually employed.

A further object is to provide means for securing any speed between high and low speed by shifting the position of a plurality of eccentrically mounted members driven from the main shaft and adapted to convey power to the countershafts and thence to the driven shaft.

A still further object is to provide means operated from the countershafts, which shall coöperate with a plurality of oscillating members operated by the eccentrics and which shall control the drive between said countershafts and eccentrics.

With the above and other objects in view, the invention consists in the novel construction, combination and arrangement of elements hereinafter described and claimed.

In the accompanying drawings, forming part of this application;—

Figure 1 is a view partly in horizontal section and partly in top plan.

Fig. 2 is a detail showing a driving sleeve carried by the main shaft.

Fig. 3 is a section through a sleeve carrying an engaging device which coöperates with the cam slot shown in Fig. 2 and effects the partial rotation of a short shaft coupled to the main shaft of the transmission.

Fig. 4 is a horizontal section showing the main shaft, the gearing and one of the countershafts.

Fig. 5 is a vertical transverse section through the main shaft, the countershaft, and showing in elevation means for driving the eccentrics and varying the position thereof.

Fig. 6 is a further vertical transverse section with parts in elevation.

Fig. 7 is a view in elevation showing a yoke member carried by an eccentric band.

Fig. 8 is a section through the yoke member of Fig. 7, parts being shown in elevation.

Figs. 9, 10 and 11 are details of the wheel adapted to be concentrically or eccentrically mounted.

Figs. 12, 13, 14 and 15 are details of construction described below.

Figure 16:
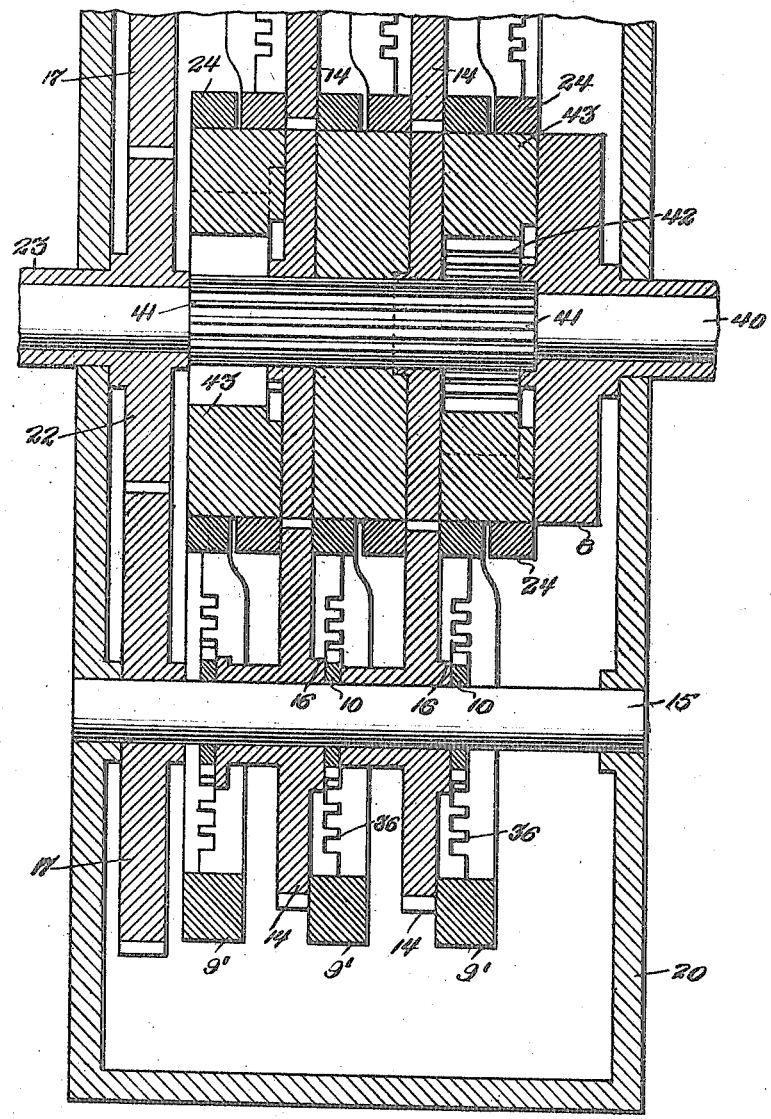
Fig. 16 is a view of a modification employing a channeled shaft for controlling the position of the eccentric disks.

In Fig. 1 the engine shaft is designated by the numeral 1 and this shaft has rigidly connected therewith a tubular shaft designated 2 within which the main shaft 3 is carried, shaft 3 being rotatable within shaft 2. A shaft member 4 is positioned between the end of shaft 1 and the end of shaft 3 and has connection with said shaft 3 by means of a tongue 4' which enters a slot 3' and provides for the partial rotation of shaft 3 when effecting a change of speed either while the main shaft is being rotated or at other times.

Tubular shaft 2 carries a sleeve 7 having a groove 7' therein for engagement by any suitable means for shifting said sleeve in effecting a change of speed. A pin 6 is rigidly mounted in sleeve 7 and passes through a slot 5 in tubular shaft 2 and enters shaft member 4, this construction being shown in detail in Fig. 3. The longitudinal movement of sleeve 7 which is rotatable with reference to shaft 2 will therefore effect the partial rotation of shaft 3 in the manner desired, slot 5 being positioned at an angle as indicated in Fig. 2.

Tubular shaft 2 carries at one end thereof within the transmission casing 20 a fly wheel 8 which serves to drive the transmission mechanism proper. Shaft 2 has a bearing in one wall of the casing as indicated at 21, and shaft 3 passing through tubular shaft 2 extends through the casing and passes through sleeve 23 constituting a hub member rigid with gear wheel 22, said sleeve and gear wheel being loosely carried by a shaft 3. This sleeve and gear wheel constitute the driven member, gear wheel 22 being in mesh with gear wheels 17 carried by countershafts 15.

A plurality of disks 11 are carried upon shaft 3 and are provided with diametrically located slots 26 permitting the movement of said disks from a concentric position to an eccentric position with reference to shaft 3. Each disk 11 is provided with a recessed portion 30 extending about the edges of the slot 26 as indicated in Fig. 9, and one edge of the recessed portion is provided with a series of teeth constituting a rack 25 adapted to be engaged by a pinion 12 a plurality of which pinions 12 are rigidly carried by shaft 3.

Each disk 11 is provided with a slot 31 on the side opposite to the rack portion 25, this slot also extending diametrically across the face of the disk, and said slot 31 is engaged by lug 19 carried upon the fly wheel 8, in order that the disk 11 adjacent to the fly wheel may be driven from that wheel; each disk 11 is constructed and mounted in a similar manner, the other disks however being engaged by a lug 13′, each carried by a gear wheel 13 rigidly mounted on shaft 3.

Gear wheels 13 are in mesh with gear wheels 14 loosely carried upon countershafts 15, and said gear wheels 14 carry cams 16 formed on the hub members of these gear wheels and designed to coöperate with the yoke members described below.

Each disk 11, adapted to be thrown eccentrically with reference to shaft 3, coöperates with a band 24 having formed integrally therewith a yoke member 9 comprising a rectangular structure or frame provided with an opening 33, portion 34 of which coöperates with cams 16 carried by the countershafts, this coöperation being illustrated in Figs. 5 and 6. Rack portions 35 and 36 are also formed on the inner edges of the yoke members and extend parallelly with reference to the edges 34. These rack portions are engaged by pinions 10 carried by the countershafts, the upper and lower racks being alternately engaged during the rotation of eccentric disks 11, in view of the operation of the cams 16 which control the position of the racks with respect to pinions 10.

Each eccentric disk 11 controls a plurality of rack members, those coöperating with the pinions of one countershaft being designated 9 and those coöperating with the pinions of the other countershaft being shown at 9′. The relative position of the eccentrics and yokes under given conditions is illustrated in Fig. 6, and the alternate engagement of the yokes with the pinions in the manner specified produces substantially continuous rotary movement of the countershafts 15. This movement is imparted to the driven member by means of gear wheels 17 meshing with gear wheel 22 constituting the driven member. Sleeve 23 formed on the gear wheel 22 is adapted to receive the end of driven shaft 23′ shown in Fig. 1.

The rotary movement imparted to engine shaft 1 and thence to the concentric shaft 2 and fly wheel 8 is imparted to the adjacent disk 11 by reason of the engagement between said fly wheel and disk through lug 19 operating within the diametrical recess or slot within said disk. This rotary movement is transformed into an oscillating movement of the eccentric band and yoke member carried thereby, and is again transformed into a rotary movement in view of the alternate engagement of the rack portions of the yoke with the pinions 10 carried by the countershaft, this alternate movement being under the control of the cams above specified. The rotary movement imparted to the countershaft is also imparted to gear wheels 17 meshing with the gear wheel 22, and the lug 13′ carried by each wheel 13 transmits movement thence to the next eccentric disk 11 by engagement with its slot. The middle eccentric 11, and that shown at the left in Fig. 4, are therefore driven from gear wheels 13, and the eccentric 11 shown at the right in Fig. 4 is driven from the fly wheel. Each eccentric controls a plurality of yoke members similarly operating in each instance for driving pinions 10 rigidly carried by the countershaft.

In the modification shown in Fig. 16 I have illustrated a main shaft 40 provided with longitudinally extending channels forming teeth 41 for engaging the toothed portions 42 along the slots of the eccentric disks 43, this channeled shaft constituting a continuous pinion taking the place of pinions 12 employed in the form previously described. In other respects the operation is substantially the same as in the previous form.

It will be understood that the reverse is effected by the movement of the sleeve 7 and its pin 6 in the opposite direction in the groove 5.

I claim:—

1. In a device of the class described, a shaft, a driving member freely mounted thereon, a driven disk, means carried by the shaft and coöperating means carried by the disk for throwing the latter to an eccentric position on the shaft, a countershaft, engaging means thereon, oscillating means carried by the disk for driving the countershaft through the medium of said engaging means thereon, a driven member, and means for transmitting motion thereto from the countershaft.

2. In a device of the class described, a shaft, a driving member freely mounted thereon, a driven disk, engaging means carried by the shaft and complementary means carried by the disk for throwing the latter to an eccentric position on the shaft, a countershaft, engaging means thereon, oscillating means including an eccentric band and a laterally projecting arm carrried thereby, said oscillating means being operated by the disk for driving the countershaft through the medium of said engaging means thereon, a driven member, and means for transmitting motion thereto from the countershaft.

3. In a device of the class described, a shaft, a driving member freely mounted thereon, a driven disk, engaging means carried by the shaft and complementary means carried by the disk for throwing the latter to an eccentric position on the shaft, means for partly rotating the shaft for controlling the eccentric, a countershaft, engaging means thereon, oscillating means operated by the disk for driving the countershaft through the medium of said engaging means thereon, a driven member, and means for transmitting motion thereto from the countershaft.

4. In a device of the class described, a shaft, a driving member freely mounted thereon, a driven disk, engaging means carried by the shaft, and complementary means carried by the disk for throwing the latter to an eccentric position on the shaft, a countershaft, engaging means thereon, oscillating means including an eccentric band, a yoke-shaped arm carried thereby and provided with a rack portion engaging the countershaft, a driven member, and means for transmitting motion thereto from the countershaft.

5. In a device of the class described, a shaft, a driving member freely mounted thereon, a disk operated from the driving member, engaging means carried by the shaft and complementary means carried by the disk for throwing the latter to an eccentric position on the shaft, a countershaft, engaging means thereon, oscillating means including an eccentric band and a laterally projecting arm forming a yoke member and having engaging portions on opposite inner sides of the yoke arms, means for throwing said engaging portions alternately into coöperation with the engaging means on the countershaft, a driven member, and means for transmitting motion thereto from the countershaft.

6. In a device of the class described, a shaft, a driving member freely mounted thereon, a driven disk provided with a slot and having a rack portion formed along the edge of the slot, means carried by the shaft for engaging the rack, and throwing the disk to eccentric position, a countershaft, engaging means thereon, coöperating oscillating means operated by the disk for driving the countershaft, a driven member, and means for transmitting motion thereto from the countershaft.

7. In a device of the class described, a shaft, a driving member freely mounted thereon, means for partly rotating the shaft independently of the driving member, a driven disk, engaging means carried by the shaft, and complementary means carried by the disk for throwing said disk to an eccentric position, a countershaft, engaging means thereon, an eccentric band operated by the disk, a yoke member extending from said band and provided with a plurality of rack portions on opposite sides of the countershaft, a cam member, means for operating the cam for throwing the rack portions alternately into engagement with the engaging means carried by the countershaft.

8. In a device of the class described, a shaft, a driving member freely mounted thereon, a disk operated by the driving member, said disk being provided with a slot through which the shaft projects and with a toothed portion adjacent one edge of the slot, a pinion carried by the shaft for engaging said rack and shifting said disk to an eccentric position with reference to the shaft, a band carried by the eccentric, an arm projecting laterally therefrom and comprising a yoke member having rack portions formed thereon, a countershaft, engaging means carried by the countershaft for coöperating with the rack portions, said rack portions being alternately engaged, a cam, the countershaft carrying the cam, a gear wheel moving with the cam and driving the latter, a gear wheel carried by the shaft first mentioned and meshing with the gear wheel last named.

9. In a device of the class described, a shaft, a driving member freely mounted thereon, a disk operated by the driving member, means for moving the disk to an eccentric position with reference to the shaft by the partial rotation of the latter independently of the driving member, oscillating means operated by the disk, a plurality of rack members carried by the oscillating means, a countershaft, engaging means thereon, said engaging means comprising a rotary toothed member the opposite portions of which engage the rack portions alternately, a countershaft, a gear wheel carried thereby, a cam driven by the gear wheel, a gear wheel carried by the main shaft and meshing with the gear wheel first mentioned, said cam controlling the position of the rack portions with reference to the engaging means on the countershaft, a driven member, and means for operating the latter from the countershaft.

10. In a device of the class described, a shaft, a driving member freely mounted thereon, a disk operated by the driving member, bands carried by said disk, means for throwing the disk to an eccentric position with reference to the shaft, a plurality of yoke members connected respectively with said bands, a plurality of countershafts, one of said shafts passing through each of said yoke members, engaging means on the shafts, engaging means on the yoke members coöperating with the engaging means on said countershafts, and means effecting the alternate engagement of the engaging means on the yoke members with corresponding means on said shafts.

11. In a device of the class described, a shaft, a driving member freely mounted thereon, a disk operated by the driving member and adapted to be thrown to eccentric position with reference to the shaft, a gear wheel mounted on the shaft, engaging means on the shaft, engaging means on said disk coöperating therewith for effecting such movement to eccentric position, a countershaft, a gear wheel carried thereby meshing with the gear wheel first mentioned, a cam driven by the gear wheel last mentioned, engaging means on the countershaft, an oscillating member comprising a band for said disk and a laterally projecting arm, a plurality of engaging members carried by the arm coöperating alternately with the engaging means on the countershaft, a driven member, and means for operating said member from the countershaft.

12. In a device of the class described, a shaft, a driving member freely mounted thereon, a plurality of disks, one of said disks being operated by the driving member, engaging means formed on said disks, complementary engaging means carried by the shaft for throwing the disks to eccentric position, gear wheels carried by said shaft, a countershaft, a plurality of gear wheels carried thereby meshing with the gear wheels first mentioned, pinions carried by the countershaft and operated independently of said gear wheels thereon, cams operating with the gear wheels on the countershaft, a plurality of oscillating members operated from the disks, engaging means thereon, certain of said means being positioned on opposite sides of the countershaft, and said cams causing the alternate engagement of the oscillating means with the pinions on the countershaft, a driven member including a gear wheel, and a gear wheel on the countershaft meshing therewith.

13. In a device of the class described, a shaft, a disk movable eccentrically with reference thereto, means for shifting the position of the disk during the rotation of the shaft, yoke members extending in opposite directions from the shaft and each formed with a band carried by the disk, a countershaft extending through each yoke member, and means for driving the countershafts from the yokes.

14. In a device of the class described, a shaft, means for imparting motion thereto, a counter-shaft, an eccentric driven from the shaft first named, an oscillating member operated by the eccentric, means for driving the countershaft from the oscillating member and engaged by the oscillating member alternately on opposite sides of said means, said member being formed with guiding means, and a device engaging the guiding means for imparting an independent oscillating movement to the oscillating member.

15. In a device of the class described, a shaft, means for imparting motion thereto, a counter-shaft, engaging means formed thereon, a yoke member having engaging means and guiding means formed thereon, said engaging means coöperating with the engaging means on the counter-shaft, means for imparting motion to the yoke member from the shaft first named, and means on the counter-shaft coöperating with the guiding means and controlling the direction of rotation imparted to the counter-shaft by the yoke member.

In testimony whereof I affix my signature.

ROBERT GRANT.

Copies of this patent may be obtained for five cents each, by addressing the "Commissioner of Patents, Washington, D. C."